(12) United States Patent
Ochiai

(10) Patent No.: US 11,339,828 B2
(45) Date of Patent: May 24, 2022

(54) METHOD OF MANUFACTURING WASHER AND WASHER

(71) Applicant: Taiho Kogyo Co., Ltd., Toyota (JP)

(72) Inventor: Hirokazu Ochiai, Toyota (JP)

(73) Assignee: TAIHO KOGYO CO., LTD., Toyota (JP)

( * ) Notice: Subject to any disclaimer, the term of this patent is extended or adjusted under 35 U.S.C. 154(b) by 213 days.

(21) Appl. No.: 16/333,389

(22) PCT Filed: Aug. 29, 2017

(86) PCT No.: PCT/JP2017/030958
§ 371 (c)(1),
(2) Date: Mar. 14, 2019

(87) PCT Pub. No.: WO2018/100814
PCT Pub. Date: Jun. 7, 2018

(65) Prior Publication Data
US 2019/0257357 A1    Aug. 22, 2019

(30) Foreign Application Priority Data

Nov. 30, 2016    (JP) .............................. JP2016-232216

(51) Int. Cl.
*F16C 33/12*        (2006.01)
*B21D 53/20*        (2006.01)
(Continued)

(52) U.S. Cl.
CPC ............. *F16C 33/122* (2013.01); *B21D 53/20* (2013.01); *B23K 26/38* (2013.01); *F16C 17/04* (2013.01); *F16C 33/12* (2013.01); *F16C 33/14* (2013.01)

(58) Field of Classification Search
CPC ........ F16C 33/122; F16C 33/12; F16C 17/04; F16C 33/14; B21D 53/20; B21D 53/22;
(Continued)

(56) References Cited

U.S. PATENT DOCUMENTS

2003/0057194 A1*   3/2003   Fidalgo ................ B23K 26/361
                                                  219/121.72
2005/0042805 A1*   2/2005   Swenson ............... B23K 26/364
                                                  438/113
(Continued)

FOREIGN PATENT DOCUMENTS

CN         101432135 A        5/2009
CN         104589392 A        5/2015
(Continued)

OTHER PUBLICATIONS

"JP52028454Atranslation", Kogyo, Mar. 1977 (Year: 1977).*
(Continued)

*Primary Examiner* — Gregory D Swiatocha
*Assistant Examiner* — Bobby Yeonjin Kim
(74) *Attorney, Agent, or Firm* — Buchanan Ingersoll & Rooney PC

(57) ABSTRACT

There is provided a method of manufacturing a washer capable of suppressing reduction in a sliding area, which includes: a preparing step of preparing a panel-shaped member N; a cutting step of cutting the panel-shaped member N with a laser L2 to thereby obtain a longitudinal member N1; and a forming step of obtaining an arc-shaped washer by using the longitudinal member N1. The panel-shaped member N has an equal width to a longitudinal width of the longitudinal member N1. The cutting step is a step of cutting the panel-shaped member N from one end to the other end in a width direction to thereby obtain the longitudinal member N1 and the forming step is a step of
(Continued)

deforming the longitudinal member N1 into an arc shape so that cut faces of the longitudinal member N1 form an outer peripheral face and an inner peripheral face.

3 Claims, 12 Drawing Sheets

(51) Int. Cl.
  *B23K 26/38* (2014.01)
  *F16C 17/04* (2006.01)
  *F16C 33/14* (2006.01)

(58) Field of Classification Search
  CPC .............. B21D 470/41; B21D 470/42; B21D 470/162; B21D 470/163; B23K 26/38; B23K 26/262; B23K 26/323; B23K 2103/20; B23K 2101/18; B23K 26/40
  See application file for complete search history.

(56) References Cited

U.S. PATENT DOCUMENTS

| | | | |
|---|---|---|---|
| 2006/0237457 A1* | 10/2006 | Shaw | B23K 26/40 220/89.2 |
| 2009/0295103 A1 | 12/2009 | Ebina et al. | |
| 2014/0209574 A1* | 7/2014 | Walsh | B23K 26/40 219/121.39 |
| 2016/0214207 A1 | 7/2016 | Okazaki | |
| 2016/0318202 A1 | 11/2016 | Wilhelm et al. | |
| 2018/0169736 A1 | 6/2018 | Ochiai | |
| 2019/0168285 A1* | 6/2019 | Obayashi | B21D 53/14 |

FOREIGN PATENT DOCUMENTS

| | | | |
|---|---|---|---|
| CN | 105317814 A | | 2/2016 |
| CN | 108136478 A | | 6/2018 |
| DE | 2615920 A1 | | 10/1977 |
| EP | 3473877 A1 | | 4/2019 |
| JP | 52028454 A | * | 3/1977 |
| JP | 52028454 A | | 3/1977 |
| JP | 60005788 U | * | 1/1985 |
| JP | 60005788 U | | 1/1985 |
| JP | 01015292 A | | 1/1989 |
| JP | 04136519 A | | 5/1992 |
| JP | 11325108 A | | 11/1999 |
| JP | 2014114880 A | | 6/2014 |
| JP | 2016163905 A | | 9/2016 |
| WO | 2015037162 A1 | | 3/2015 |

OTHER PUBLICATIONS

Office Action (Notice of Reasons for Refusal) dated Jan. 14, 2020, by the Japanese Patent Office in corresponding Japanese Patent Application No. 2016-232216, and an English Translation of the Office Action. (10 pages).
International Search Report (PCT/ISA/210) and Written Opinion (PCTZISAZ237) dated Nov. 7, 2017, by the Japanese Patent Office as the International Searching Authority for International Application No. PCT/JP2017/030958.
Y. Yuanyuan, et al., "New Materials and Science and Technology", Volume of Metallic Materials, Sep. 30, 2012., with a partial English Translation. (6 pages).
First Office Action dated Mar. 3, 2020, by the Chinese Patent Office in corresponding Chinese Patent Application No. 201780073549.5, and an English Translation of the Office Action. (14 pages).
Office Action issued in corresponding German Patent Application No. 112017006075.3, dated Feb. 9, 2021, with English translation, 15 pages.

* cited by examiner

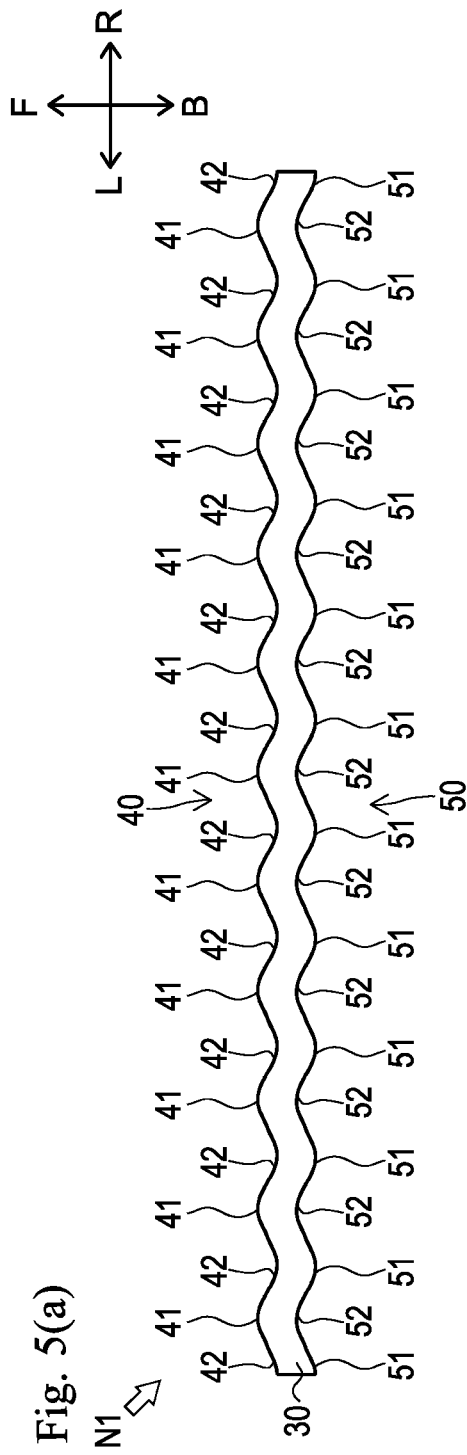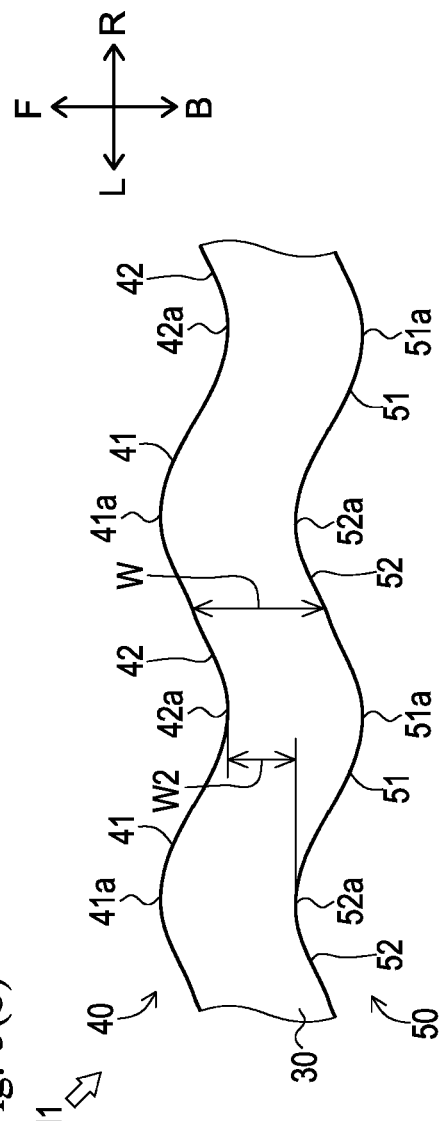

METHOD OF MANUFACTURING WASHER AND WASHER

TECHNICAL FIELD

The present invention relates to a method of manufacturing a washer for receiving a load and a technique of a washer.

BACKGROUND ART

Conventionally, a washer for receiving a load is formed by stamping a substantially panel-shaped metal material into a ring shape by use of a forming die. For example, such a technique is described in Patent Literature 1.

However, the metal material is stamped in the technique described in Patent Literature 1 and therefore droops N902 and burrs N903 are formed as shown in FIGS. 11(a) and 11(b). The droops N902 shown in FIGS. 11(a) and 11(b) are formed on a lower face (a sliding face) of a sliding portion N930 and formed throughout outer peripheral and inner peripheral end portions of the sliding portion N930. The droops N902 are formed in arc shapes (or a curved face shapes) in cross-sectional view. A radial length D1 of each of the droops N902 is 0.2 to 1.0 mm, for example. If the droops N902 are formed, entire areas of the outer peripheral and inner peripheral end portions of the lower face of the sliding portion N930 are in chamfered shapes. In this case, the sliding portion N930 is not able to slide against the other member at the portions (see the radial lengths D1 of the droops N902 shown in FIGS. 11(a) and 11(b)) where the droops N902 are formed. Therefore, a portion of the lower face of the sliding portion N930 where the droops N902 are not formed, i.e., an area of the portion with dotted diagonal hatch lines shown in FIG. 11(a) serves as a sliding area. As described above, in the prior art, the sliding area may be reduced by the formation of the droops N902.

CITATION LIST

Patent Literature

Patent Literature 1: Japanese Patent Application Laid-open No. 11-325108

SUMMARY OF INVENTION

Technical Problem

The present invention has been made with the above-described circumstances in view and an object of the invention is to provide a method of manufacturing a washer and a washer, with which reduction in a sliding area can be suppressed.

Solution to Problem

The problem to be solved by the present invention is as described above and a solution to the problem will be described next.

A method of manufacturing a washer according to an aspect of the invention includes: a preparing step of preparing a panel-shaped member; a cutting step of cutting the panel-shaped member with a laser to thereby obtain a longitudinal member; and a forming step of obtaining an arc-shaped washer by using the longitudinal member.

In the method of manufacturing the washer according to the aspect of the invention, the panel-shaped member has an equal width to a longitudinal width of the longitudinal member, the cutting step is a step of cutting the panel-shaped member from one end to the other end in a width direction to thereby obtain the longitudinal member, and the forming step is a step if deforming the longitudinal member into an arc shape so that cut faces of the longitudinal member form an outer peripheral face and an inner peripheral face.

A washer according to another aspect of the invention is a washer including a sliding portion capable of sliding against the other member. A substantially right-angled edge portion in cross-sectional view is formed at at least a part of an outer edge of the sliding portion.

In the washer according to the aspect of the invention, the edge portion is formed to have a radius of curvature in cross-sectional view of 0.05 mm or smaller.

In the washer according to the aspect of the invention, the sliding portion is formed in an arc shape and the edge portion is formed at a portion of the sliding portion corresponding to an outer peripheral portion of the arc.

In the washer according to the aspect of the invention, the sliding portion is formed in an arc shape and the edge portion is formed at a portion of the sliding portion corresponding to an inner peripheral portion of the arc.

Advantageous Effects of Invention

As effects of the present invention, the invention exerts the following effects.

By the method of manufacturing the washer according to the aspect of the invention, it is possible to suppress reduction in a sliding area.

By the method of manufacturing the washer according to the aspect of the invention, it is possible to improve material yield.

In the washer according to the aspect of the invention, it is possible to suppress the reduction in the sliding area.

In the washer according to the aspect of the invention, it is possible to effectively suppress the reduction in the sliding area.

BRIEF DESCRIPTION OF DRAWINGS

FIG. 5(a) is a plan view of the cut longitudinal member. FIG. 5(b) is an enlarged plan view of wave-shaped portions.

DESCRIPTION OF EMBODIMENT

In the following description, directions shown by arrows U, D, F, B, L, and R in the figures are respectively defined as upward, downward, forward, backward, leftward, and rightward directions.

A method of manufacturing a washer 10 and the washer 10 according to an embodiment of the present invention will be described below.

Figure 8:
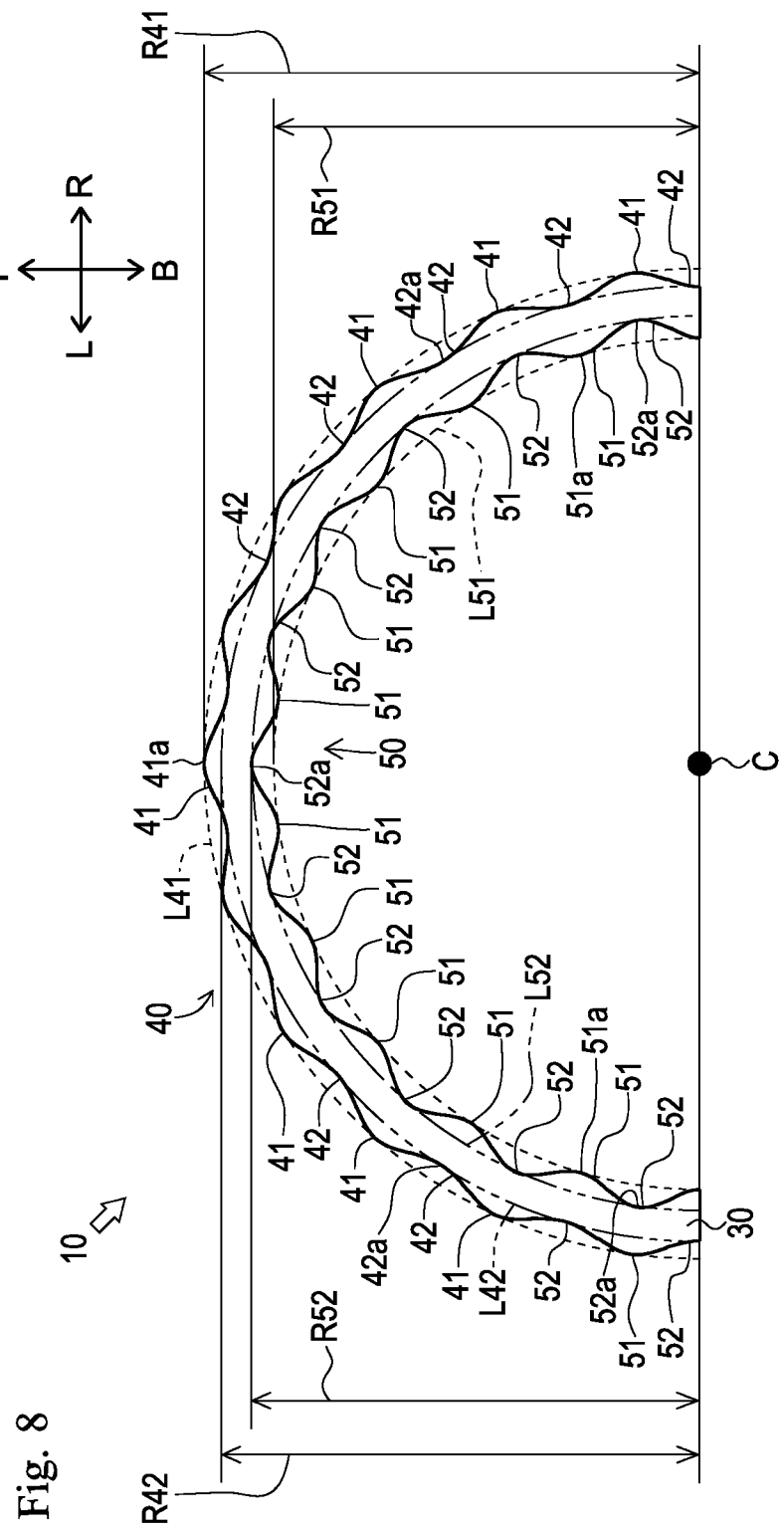
FIG. 8 is a plan view of the manufactured washer.

The washer 10 shown in FIG. 8 is a member for receiving a load as necessary. The washer 10 is formed in a semicircular shape (an arc shape) in plan view. The washer 10 is formed by a bimetal member obtained by bonding two kinds of metal materials together. The method of manufacturing the washer 10 according to the embodiment is for manufacturing such a washer 10.

Figure 1:
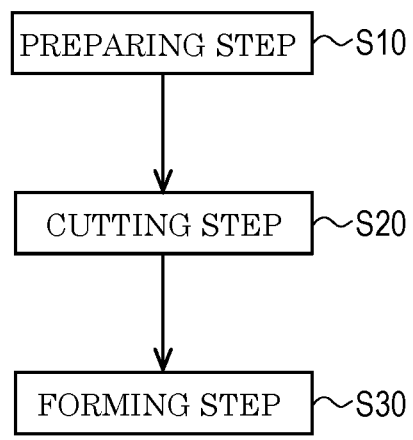
FIG. 1 is a flowchart of a method of manufacturing a washer according to an embodiment of the present invention.
Figure 2:
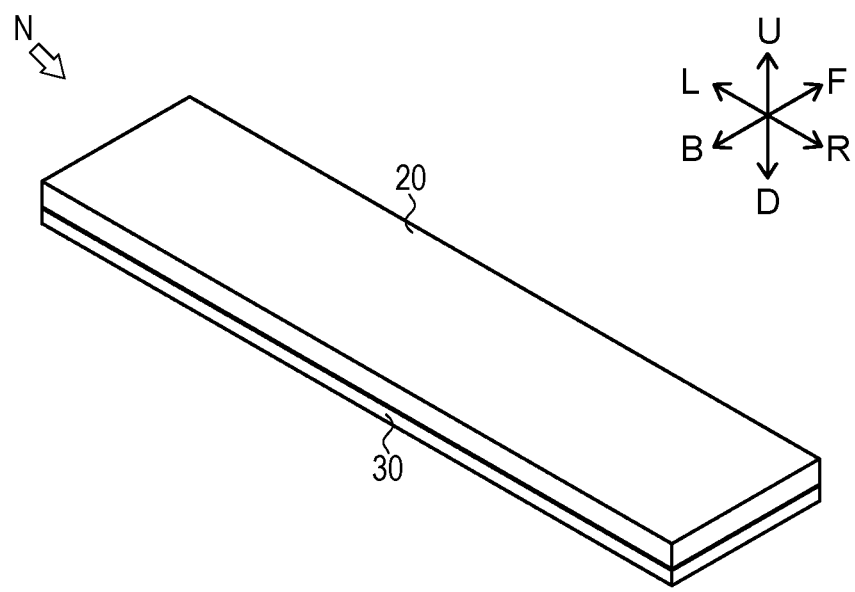
FIG. 2 is a perspective view of a panel-shaped member.

As shown in FIG. 1, in the method of manufacturing the washer 10 according to the embodiment, a preparing step is carried out first (step S10). The preparing step is a step of preparing a panel-shaped member N shown in FIG. 2. In a state shown in FIG. 2, the panel-shaped member N is disposed with its panel faces facing up and down and its longitudinal direction oriented in the left-right direction. The panel-shaped member N is formed by the bimetal member including a back metal 20 and a sliding portion 30.

The back metal 20 is a member for fixing the sliding portion 30 (described later). The back metal 20 is disposed at an upper part of the washer 10. The back metal 20 is made of iron, for example.

The sliding portion 30 is a portion for sliding against the other member. The sliding portion 30 is disposed at a lower part of the washer 10 (under the back metal 20) and bonded to the back metal 20. The sliding portion 30 is made of a metal material with a lower coefficient of friction than the back metal 20, e.g., an aluminum alloy.

As shown in FIG. 1, after the preparing step, a cutting step is carried out (step S20). The cutting step is a step of cutting the panel-shaped member N.

Figure 3:
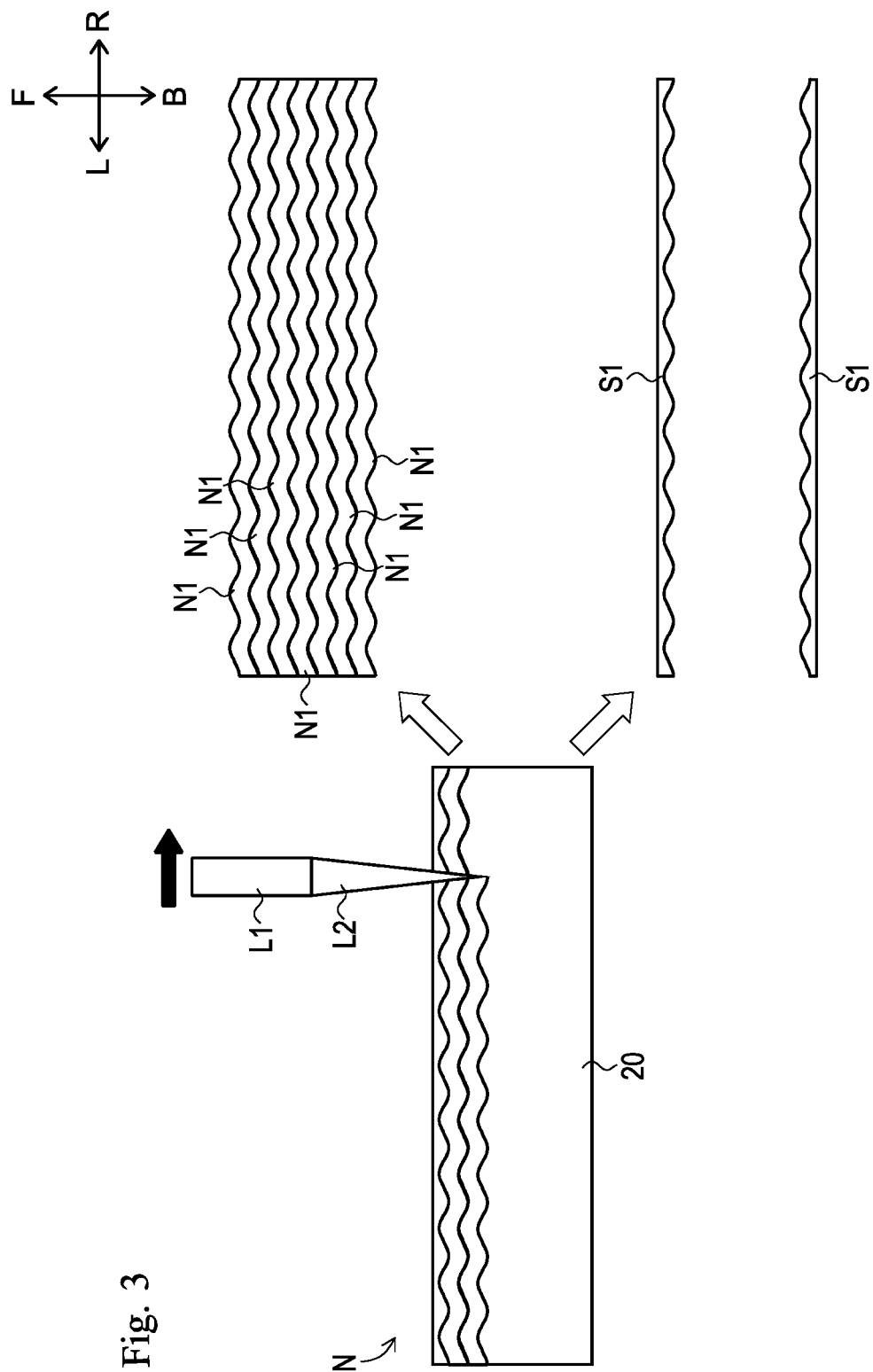
FIG. 3 is a view showing how the panel-shaped member is cut.
Figure 4:
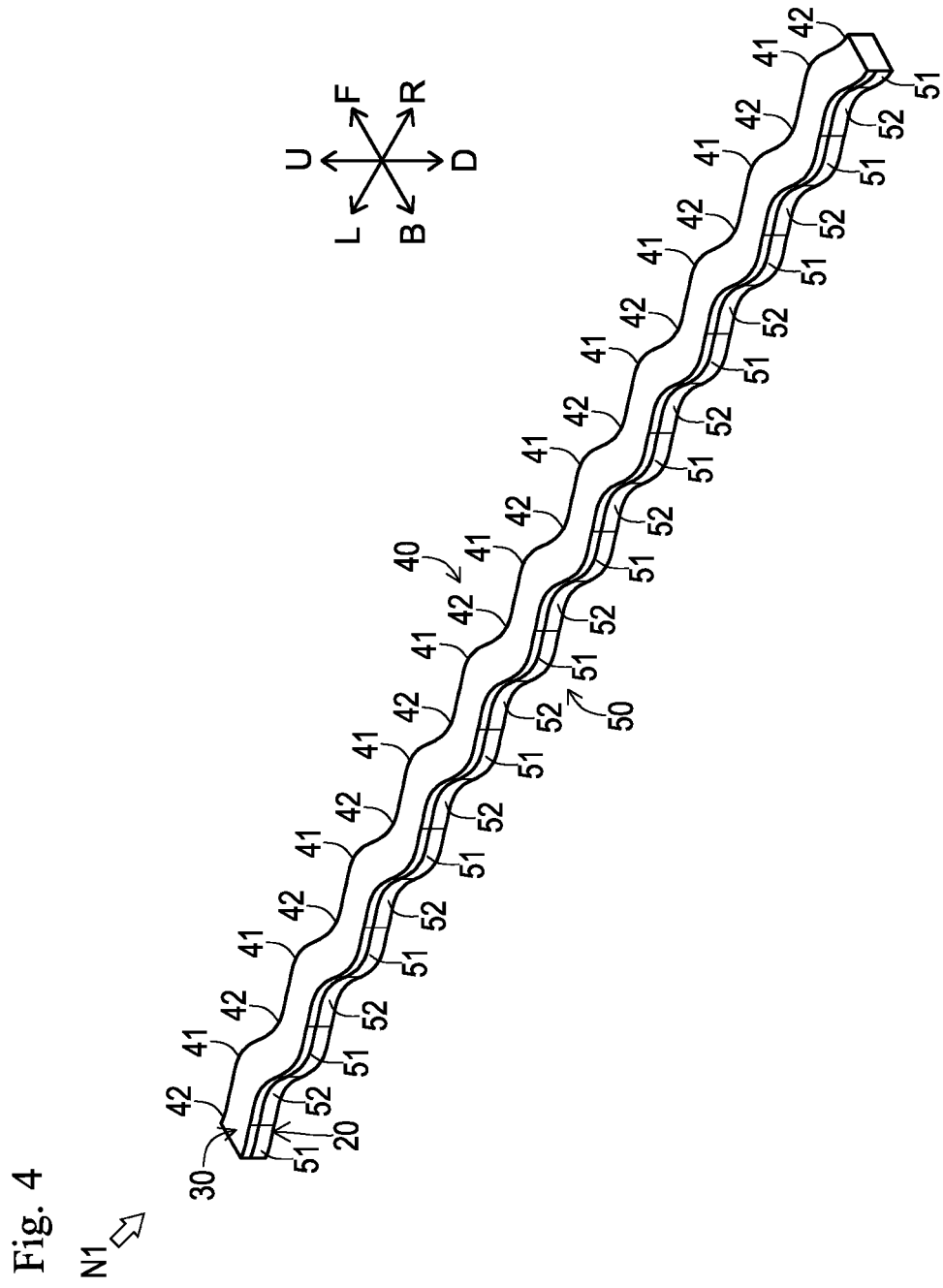
FIG. 4 is a perspective view of a cut longitudinal member.

As shown in FIG. 3, in the cutting step, a laser L2 is applied and assist gas is jetted from a laser cutting machine L1 to the back metal 20 of the panel-shaped member N. In this way, the laser cutting machine L1 melts the panel-shaped member N and blows away molten metal. The laser cutting machine L1 moves substantially in the left-right direction while applying the laser L2 and jetting the assist gas. In this way, the laser cutting machine L1 cuts through the panel-shaped member N from a left end portion to a right end portion to cut off a part of the panel-shaped member N. As a result, the panel-shaped member N is divided into a plurality of (seven, in the embodiment) longitudinal members N1 and two scraps S1. In the embodiment, air is employed as the assist gas.

As shown in FIGS. 4 to 6(b), each of the longitudinal members N1 cut in the cutting step is disposed with its longitudinal direction oriented in the left-right direction and its short-side direction in a front-back direction. In FIGS. 4 to 7(b), the longitudinal member N1 with the sliding portion 30 (described later) facing up is shown. A longitudinal width (a left-right width) of the longitudinal member N1 is equal to a longitudinal width (a left-right width) of the panel-shaped member N. The longitudinal member N1 (the back metal 20 and the sliding portion 30) has a front wave-shaped portion 40, a back wave-shaped portion 50, a front molten portion 60, a back molten portion 70, a front edge portion 80, and a back edge portion 90.

The back metal 20 and the sliding portion 30 are formed to extend substantially in the left-right direction and have the same shapes as each other. Front faces and back faces of the back metal 20 and the sliding portion 30 are cut faces formed by the laser L2.

The front wave-shaped portion 40 is formed on the front face of the longitudinal member N1 (the back metal 20 and the sliding portion 30). The front wave-shaped portion 40 has peak portions 41 and trough portions 42.

The peak portions 41 are portions formed to protrude forward (in the short-side direction) on the front face of the longitudinal member N1. A tip end portion (an apex portion) 41a of each of the peak portions 41 is formed in a substantially arc shape in plan view. Each of the peak portions 41 is formed from an upper end portion to a lower end portion (an upper face of the sliding portion 30 to a lower face of the back metal 20) of the longitudinal member N1. The plurality of (eleven, in the embodiment) peak portions 41 are formed in the left-right direction with the trough portions 42 (described later) sandwiched between the peak portions 41.

The trough portions 42 are portions formed to be recessed backward (in the short-side direction) on the front face of the longitudinal member N1. The plurality of (twelve, in the embodiment) trough portions 42 are formed continuously with the peak portions 41 in the left-right direction. The trough portions 42 disposed at a left-right middle portion (other than the trough portions 42 on a left end portion and a right end portion) are formed to have substantially the same outside shapes (substantially the same left-right widths, front-back widths, and shapes of tip end portions (bottom portions) 42a) as the peak portions 41. The trough portion 42 disposed at the left end portion is formed in a substantially arc shape obtained by cutting off a left half of the shape of the trough portion 42 disposed at the left-right middle portion in plan view. The trough portion 42 disposed at the right end portion is formed in a substantially arc shape obtained by cutting off a right half of the shape of the trough portion 42 disposed at the left-right middle portion in plan view. The trough portion 42 is formed from the upper end portion to the lower end portion of the longitudinal member N1.

The front wave-shaped portion 40 configured in this manner is formed from the left end portion to the right end portion of the front face of the longitudinal member N1. In this way, the front face of the longitudinal member N1 is formed in a substantially sinusoidal shape in plan view with the peak portions 41 and the trough portions 42 formed alternately and continuously throughout the face.

The back wave-shaped portion 50 is formed on the back face of the longitudinal member N1. The back wave-shaped portion 50 has peak portions 51 and trough portions 52.

The peak portions 51 are portions formed to protrude backward (in the short-side direction) on the back face of the longitudinal member N1. The plurality of (twelve, in the embodiment) peak portions 51 are formed in the left-right direction with the trough portions 52 of the back wave-shaped portion 50 (described later) sandwiched between the peak portions 51. The peak portions 51 disposed at the left-right middle portion (other than the peak portions 51 on the left end portion and the right end portion) are formed to have substantially the same outside shapes (substantially the same left-right widths, front-back widths, and shapes of tip end portions (apex portions) 51a) as the trough portions 42 of the front wave-shaped portion 40. The peak portions 51 disposed at the left end portion is formed in a substantially arc shape obtained by cutting off a left half of the shape of the peak portion 51 disposed at the left-right middle portion in plan view. The peak portion 51 disposed at the right end portion is formed in a substantially arc shape obtained by cutting off a right half of the shape of the peak portion 51 disposed at the left-right middle portion in plan view. The peak portion 51 is formed from the upper end portion to the lower end portion of the longitudinal member N1. The peak portions 51 are respectively disposed behind the trough portions 42 of the front wave-shaped portion 40. In other words, the peak portions 51 are disposed at positions displaced from the peak portions 41 of the front wave-shaped portion 40 in the left-right direction.

The trough portions 52 are portions formed to be recessed forward (in the short-side direction) on the back face of the longitudinal member N1. The trough portions 52 are formed to have substantially the same outside shapes (substantially the same left-right widths, front-back widths, and shapes of tip end portions (bottom portions) 52a) as the peak portions 41 of the front wave-shaped portion 40. The plurality of (eleven, in the embodiment) trough portions 52 are formed continuously with the peak portions 51 in the left-right direction. Each of the trough portions 52 is formed from the upper end portion to the lower end portion (the upper face to the lower face) of the longitudinal member N1. The trough portions 52 are respectively disposed behind the peak portions 41 of the front wave-shaped portion 40. In other words, the trough portions 52 are disposed at positions displaced from the trough portions 42 of the front wave-shaped portion 40 in the left-right direction.

The back wave-shaped portion 50 configured in this manner is formed from the left end portion to the right end portion of the back face of the longitudinal member N1. In this way, the back face of the longitudinal member N1 is formed in a substantially sinusoidal shape in plan view with the peak portions 51 and the trough portions 52 of the back wave-shaped portion 50 formed alternately and continuously throughout the face.

The longitudinal member N1 is disposed with the peak portions 41 of the front wave-shaped portion 40 and the trough portions 52 of the back wave-shaped portion 50 aligned with each other in the left-right direction and the trough portions 42 of the front wave-shaped portion 40 and the peak portions 51 of the back wave-shaped portion 50 aligned with each other in the left-right direction. In this way, the longitudinal member N1 is formed in a substantially sinusoidal shape in plan view with a constant front-back width W (a distance from the front face to the back face along the front-back direction). In this way, the longitudinal member N1 has the front face and the back face substantially in the same shapes. A distance W2 (see FIG. 5(b)) from the trough portion 42 of the front wave-shaped portion 40 to the trough portion 52 of the back wave-shaped portion 50 along the front-back direction is about a half of the front-back width W. In this way, it is possible to reduce a volume of the longitudinal member N1 according to the embodiment to thereby reduce a weight of the longitudinal member N1.

Figure 6A:
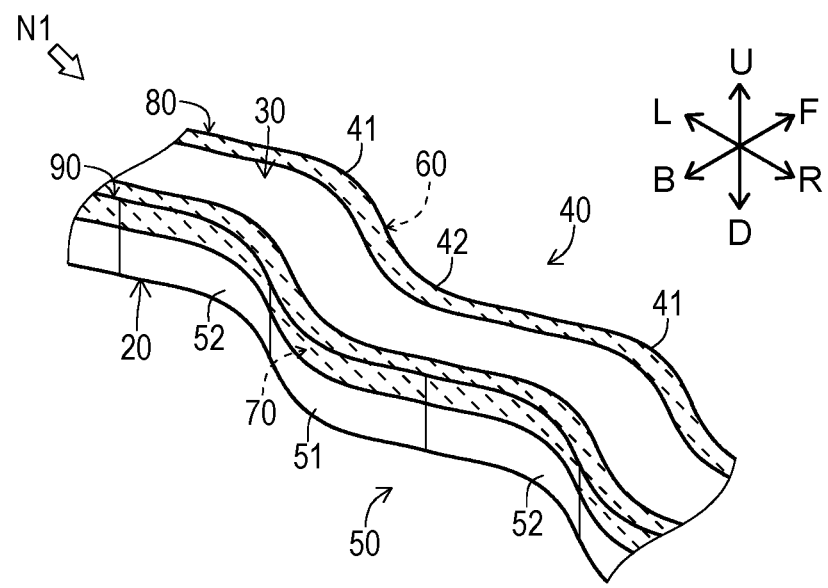
FIG. 6(a) is an enlarged perspective view of the longitudinal member.
Figure 6B:
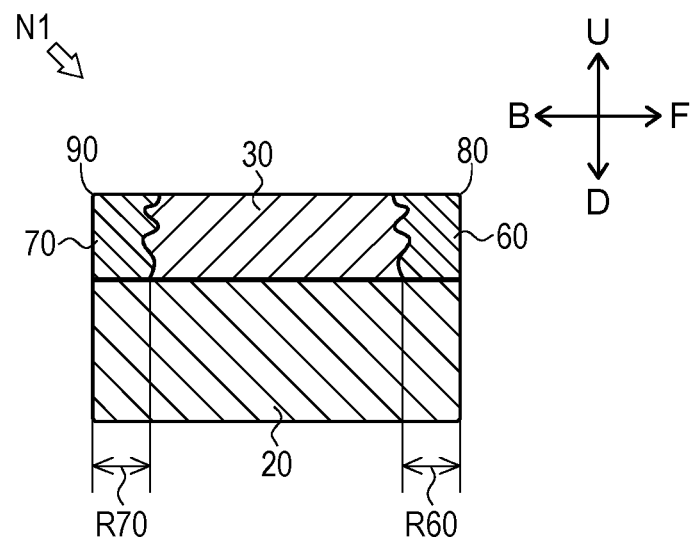
FIG. 6(b) is an enlarged side cross-sectional view of the same.

The front molten portion 60 shown in FIGS. 6(a) and 6(b) is formed by melting a part of an outer edge portion of the longitudinal member N1, i.e., a front end portion of the sliding portion 30 in the embodiment (more specifically, by bringing the molten front end portion back to room temperature). When the front end portion of the sliding portion 30 becomes molten, the back metal 20 and the sliding portion 30 are brought in firm and close contact with each other at the molten portion (see a closer contact range R60 shown in FIG. 6(b)). In this way, the front molten portion 60 joins the back metal 20 and the sliding portion 30 to each other at a front end portion of the longitudinal member N1.

The front molten portion 60 is formed throughout the front end portion of the sliding portion 30 (from a left end portion to a right end portion). The front molten portion 60 according to the embodiment is formed by cutting the panel-shaped member N with the laser L2 in the cutting step.

As described above, in the cutting step according to the embodiment, the air is employed as the assist gas in cutting the panel-shaped member N. In this way, in the cutting step, the molten metal of the panel-shaped member N is reacted with the assist gas and oxidized. As a result, colors of the back metal 20 and the sliding portion 30 on the cut face (the front wave-shaped portion 40) after the cutting are different from colors before the cutting.

The front molten portion 60 is subjected to heat treatment, when the panel-shaped member N is cut with the laser L2, to thereby have higher hardness than the other portion of the sliding portion 30 (a part of the sliding portion 30 excluding the front molten portion 60 and the back molten portion 70 (described later)). For example, if the sliding portion 30 is made of an Al—Sn-based alloy, the original hardness (the hardness before the cutting) is about Hv 35 to 55 while the hardness of the front molten portion 60 (the hardness after the cutting) is Hv 70 to 90.

The back molten portion 70 is formed by melting a back end portion of the sliding portion 30 (more specifically, by bringing the molten back end portion back to room temperature). In this way, at the back end portion of the sliding portion 30, the back metal 20 and the sliding portion 30 are brought in firm and close contact with each other (see a closer contact range R70 shown in FIG. 6(b)). The back molten portion 70 is configured similarly to the front molten portion 60 except that the back molten portion 70 is formed throughout the back end portion of the sliding portion 30. As a result, colors of the back metal 20 and the sliding portion 30 on the cut face (the back wave-shaped portion 50) after the cutting are different from colors before the cutting.

The front edge portion 80 is a portion formed in a substantially right-angled shape in side cross-sectional view. The front edge portion 80 is formed at a part of outer edges (a front upper end portion, a back upper end portion, a left upper end portion, and a right upper end portion) of the sliding portion 30, i.e., at the front upper end portion in the embodiment. More specifically, the front edge portion 80 is formed throughout the front upper end portion of the sliding portion 30 (from the left end portion to the right end portion). The front edge portion 80 according to the embodiment is formed to have a radius of curvature in cross-sectional view of 0.05 mm or smaller. The front edge portion 80 according to the embodiment is formed by cutting the panel-shaped member N with the laser L2.

The back edge portion 90 is configured similarly to the front edge portion 80 except that the back edge portion 90 is formed throughout the back upper end portion of the sliding portion 30.

As shown in FIG. 1, after the cutting step, a forming step is carried out (step S30). The forming step is a step of forming the longitudinal member N1 into a desired shape. The longitudinal member N1 according to the embodiment is plastically deformed to thereby be formed into an arc shape in the forming step.

Figure 7A:
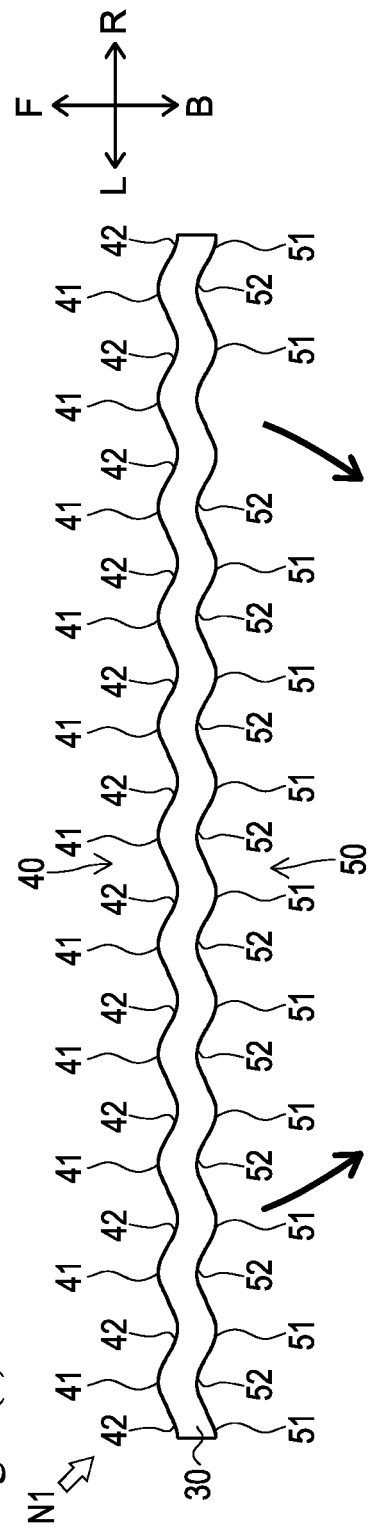
FIG. 7(a) is a view showing how the longitudinal member is deformed.
Figure 7B:
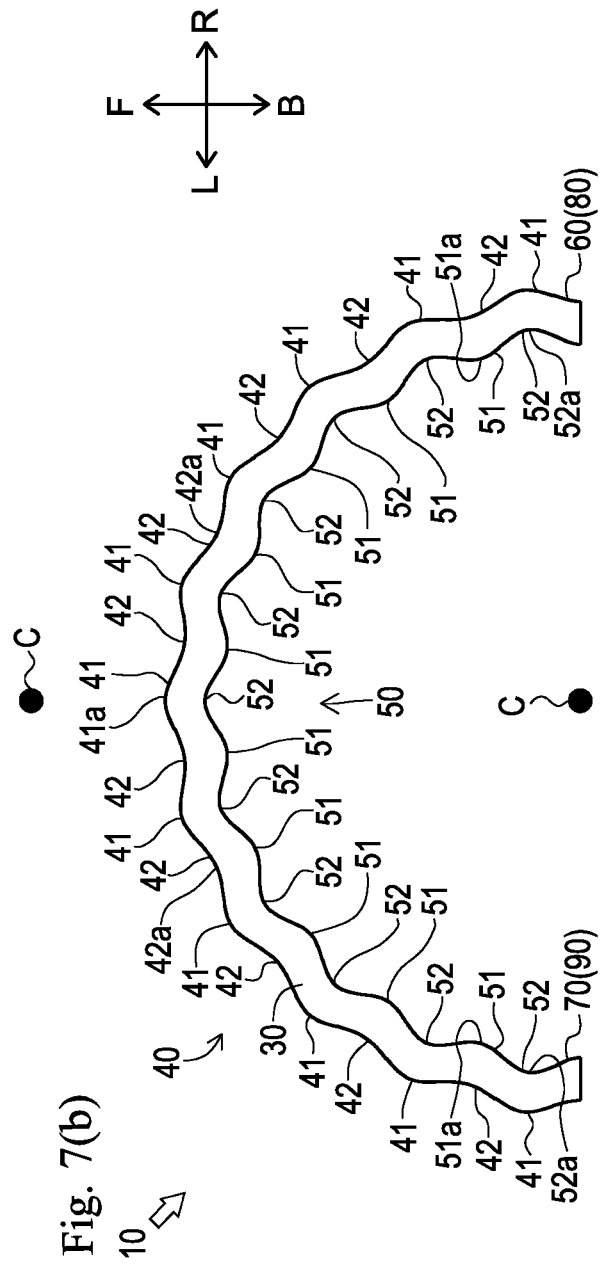
FIG. 7(b) is a view of the deformed longitudinal member.

More specifically, in the forming step, the longitudinal member N1 is restrained with a predetermined jig. Then, as shown in FIGS. 7(a) and 7(b), a right portion and a left portion are bent backward (toward a point C disposed behind the longitudinal member N1). In this way, the longitudinal member N1 is plastically deformed into a semi-circular shape centered at the point C in plan view. In this manner, the longitudinal member N1 is formed as the washer 10. On an outer peripheral side of the washer 10, the front wave-shaped portion 40, the front molten portion 60, and the front edge portion 80 are disposed. On an inner peripheral side of the washer 10, the back wave-shaped portion 50, the back molten portion 70, and the back edge portion 90 are disposed.

When this forming step is carried out, the peak portions 41 and the trough portions 42 of the front wave-shaped portion 40 are stretched in a circumferential direction of the washer 10. At this time, a stress is likely to act on the trough portions 42 (especially, the tip end portions 42a). As a result, as shown in FIGS. 7(a) to 8, the trough portions 42 are mainly stretched on an outer peripheral face of the washer 10 (the front face of the longitudinal member N1).

An imaginary line L41 shown by a broken line in FIG. 8 is a curve connecting the tip end portions 41a of the peak portions 41 of the front wave-shaped portion 40. An imaginary line L42 shown by a two-dot chain line in FIG. 8 is a curve connecting the tip end portions 42a of the trough portions 42 of the front wave-shaped portion 40. An imaginary line L51 shown by a broken line in FIG. 8 is a curve connecting the tip end portions 51a of the peak portions 51 of the back wave-shaped portion 50. An imaginary line L52 shown by a two-dot chain line in FIG. 8 is a curve connecting the tip end portions 52a of the trough portions 52 of the back wave-shaped portion 50. The imaginary lines L41, L42, L51, and L52 are formed in semicircular shapes centered at the point C in plain view.

A radius R41 shown in FIG. 8 is a radius of the imaginary line L41 (a distance along a radial direction from the point C to the tip end portion 41a of the peak portion 41 of the front wave-shaped portion 40). A radius R42 shown in FIG. 8 is a radius of the imaginary line L42 (a distance along the radial direction from the point C to the tip end portion 42a of the trough portion 42 of the front wave-shaped portion 40). A radius R51 shown in FIG. 8 is a radius of the imaginary line L51 (a distance along the radial direction from the point C to the tip end portion 51a of the peak portion 51 of the back wave-shaped portion 50). A radius R52 shown in FIG. 8 is a radius of the imaginary line L52 (a distance along the radial direction from the point C to the tip end portion 52a of the trough portion 52 of the back wave-shaped portion 50).

Because the longitudinal member N1 has the trough portions 42 of the front wave-shaped portion 40, portions around the tip end portions 42a of the trough portions 42 are the most likely to be deformed. In other words, in the forming step, the portions around the tip end portions 42a of the trough portions 42 (not the peak portion 41) are mainly deformed (stretched). Looking at the portions (the portions around the tip end portions 42a of the trough portions 42), a radius of curvature of deformation in the forming step is not the radius R41 of the imaginary line L41 but the radius R42 of the imaginary line L42 which is smaller than the radius R41, because the trough portions 42 are provided. In other words, it is possible to provide larger curvature to an outer peripheral side of the longitudinal member N1. Through this forming step, the trough portions 42 become wide open (wider than before the forming step).

When this forming step is carried out, the peak portions 51 and the trough portions 52 of the back wave-shaped portion 50 are compressed in the circumferential direction of the washer 10. At this time, a stress is likely to act on the trough portions 52 (especially, the tip end portions 52a). Therefore, on the back face of the longitudinal member N1, the trough portions 52 are mainly compressed.

Because the longitudinal member N1 has the trough portions 52 of the back wave-shaped portion 50, portions around the tip end portions 52a of the trough portions 52 are the most likely to be deformed. In other words, in the forming step, the portions around the tip end portions 52a of the trough portions 52 (not the peak portions 51) are mainly deformed (compressed). Looking at the portions (the portions around the tip end portions 52a of the trough portions 52), a radius of curvature of deformation in the forming step is not the radius R51 of the imaginary line L51 but the radius R52 of the imaginary line L52 which is larger than the radius R51, because the trough portions 52 are provided. In other words, it is possible to provide smaller curvature to an inner peripheral side of the longitudinal member N1. Through this forming step, the trough portions 52 become narrowly open (narrower than before the forming step).

As described above, it is possible to reduce a difference between the curvature of the outer peripheral side and the curvature of the inner peripheral side of the washer 10 according to the embodiment. In this way, it is possible to easily deform the longitudinal member N1 by bending (with small forces) as in the case of deforming a narrow member (a member having a shorter front-back width than the front-back width W and a rectangular shape in plan view) by bending.

Because the peak portions 41, 51 of the front wave-shaped portion 40 and the back wave-shaped portion 50 are formed on the outer peripheral face and an inner peripheral face of the washer 10, it is possible to increase a sliding area (an area of an upper face of the sliding portion 30). Therefore, even if the trough portions 42, 52 are formed to reduce the sliding area of the washer 10, it is possible to suppress the reduction in the sliding area with the peak portions 41, 51.

As shown in FIGS. 7(a) and 7(b), by forming the trough portions 52 of the back wave-shaped portion 50 on the inner peripheral face (back face) of the washer 10 (the longitudinal member N1), a gap is provided to the inner peripheral face (back face). In this way, it is possible to secure a clearance for the washer 10 (longitudinal member N1) in the forming step (the compression). Therefore, in the forming step, it is possible to deform the back face of the longitudinal member N1 by bending without straining the back face. As a result, it is possible to suppress upward and downward protrusion of the inner peripheral end portions, which improves quality of the washer 10.

With the above-described steps, manufacturing of the washer 10 is completed. The washer 10 has the back metal 20, the sliding portion 30, the front wave-shaped portion 40, the back wave-shaped portion 50, the front molten portion 60, the back molten portion 70, the front edge portion 80, and the back edge portion 90. The back metal 20 and the sliding portion 30 are formed to have the same shapes as each other. The sliding portion 30 is bonded to the back metal 20 so that the outer edges of the sliding portion 30 and the back metal 20 are aligned with each other.

The one semicircular washer 10 manufactured as described above is brought in abutment with circumferential end portions of another semicircular washer 10. The one semicircular washer 10 is joined to the other semicircular washer 10 by a suitable method such as laser welding. The joined washer 10 is formed in an annular shape and provided to a suitable member (e.g., a housing for supporting a shaft member). In this state, the washer 10 can receive a load (e.g., an axial load from the shaft member). The upper face of the washer 10 is able to slide against the shaft member. Lubricant is fed from a predetermined lubricant passage to the trough portions 42, 52 of the front wave-shaped portion 40 and the back wave-shaped portion 50 of the washer 10. The lubricant is kept in the trough portions 42, 52.

In this way, the trough portions 42, 52 of the front wave-shaped portion 40 and the back wave-shaped portion 50 of the washer 10 are able to function as oil reservoirs, which improves lubricity. Especially, the washer 10 is able to keep much lubricant in the wide-open trough portions 42, which effectively improves the lubricity.

Figure 12:
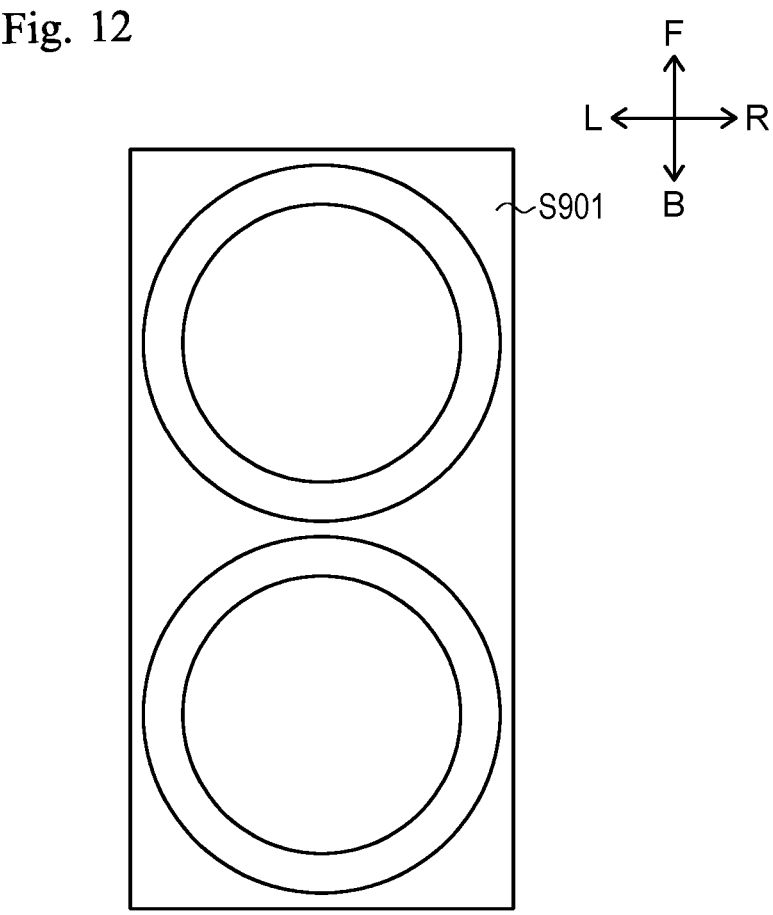
FIG. 12 is a plan view of scraps according to the prior art.

By using the method of manufacturing the washer 10 according to the embodiment, it is possible to cut the panel-shaped member N into the longitudinal members N1 arranged in the front-back direction in the cutting step (see FIG. 3). Therefore, by the method of manufacturing the washer 10 according to the embodiment, it is possible to cut the panel-shaped member N substantially without forming gaps, which improves material yield (see the scraps S1 shown in FIG. 3 and scraps S901 resulting from stamping of a panel-shaped member into ring shapes in FIG. 12).

Especially, because the longitudinal member N1 according to the embodiment has the front face and the back face formed in substantially the same shapes, the longitudinal member N1 is able to be disposed without spaces between other longitudinal members N1 and itself in the front-back direction while aligned with the other longitudinal members N1 in the left-right direction as shown in FIG. 3. Therefore, it is unnecessary to leave spaces between the longitudinal members N1 along the front-back direction in cutting the panel-shaped member N in the cutting step, which effectively improves the material yield.

Because the longitudinal member N1 is able to be disposed without the spaces between the other longitudinal members N1 and itself in the front-back direction while aligned with the other longitudinal members N1 in the left-right direction, it is possible to obtain the plurality of longitudinal members N1 from the panel-shaped member N by only cutting the panel-shaped member N having the equal width to the longitudinal widths of the longitudinal members N1 in the width direction (the direction of the equal widths, i.e., the left-right direction in the embodiment). In this way, it is possible to cut the panel-shaped member N without wasting a left end portion and a right end portion of the panel-shaped member N. As a result, it is possible to effectively improve the material yield.

The longitudinal member N1 (the washer 10) according to the embodiment is formed by the bimetal member having an upper face and a lower face made of different metal materials. In this case, the upper face (the sliding portion 30) and the lower face (the back metal 20) of the longitudinal member N1 have different deformation amounts (stretch amounts and compression amounts) under a bending load. When such a longitudinal member N1 is bent, the front face of the longitudinal member N1 is largely stretched and the back face is largely compressed. Because a difference in deformation amount between the back metal 20 and the sliding portion 30 becomes large, the back metal 20 and the sliding portion 30 may become detached from each other.

Therefore, in the longitudinal member N1 (the washer 10) according to the embodiment, the back metal 20 and the sliding portion 30 are joined to each other by the front molten portion 60 and the back molten portion 70 at the outer peripheral and inner peripheral end portions (the outer edge portions) shown in FIGS. 6(*a*) and 6(*b*). In this way, it is possible to firmly fix the back metal 20 and the sliding portion 30 to each other with the front molten portion 60 and the back molten portion 70 in the washer 10. As a result, even though the longitudinal member N1 is manufactured by bending, it is possible to suppress the detachment of the back metal 20 and the sliding portion 30 from each other.

The colors of the back metal 20 and the sliding portion 30 on the cut faces (the front wave-shaped portion 40 and the back wave-shaped portion 50) after the cutting are different from the colors before the cutting. In this way, it is easy to visually recognize whether the front molten portion 60 and the back molten portion 70 are formed as intended. In an inspection of the front molten portion 60 and the back molten portion 70 (e.g., an inspection as to whether the back metal 20 and the sliding portion 30 are joined to each other or a hardness inspection), it is easy to find the front molten portion 60 and the back molten portion 70. Therefore, it is possible to swiftly conduct the inspection of the front molten portion 60 and the back molten portion 70.

Because the longitudinal member N1 according to the embodiment has the larger curvature of the outer peripheral side due to the trough portions 42 of the front wave-shaped portion 40, it is possible to reduce the stretch amount of the outer peripheral side (the front face). Because the longitudinal member N1 has the smaller curvature of the inner peripheral side due to the trough portions 52 of the back wave-shaped portion 50, it is possible to reduce the compression amount of the inner peripheral face (the back face). In other words, by reducing the difference in curvature between the outer peripheral side and the inner peripheral side of the longitudinal member N1, it is possible to reduce the difference in deformation amount between the outer peripheral side and the inner peripheral side. As a result, it is possible to suppress the detachment of the back metal 20 and the sliding portion 30 of the longitudinal member N1 from each other.

Figure 10A:
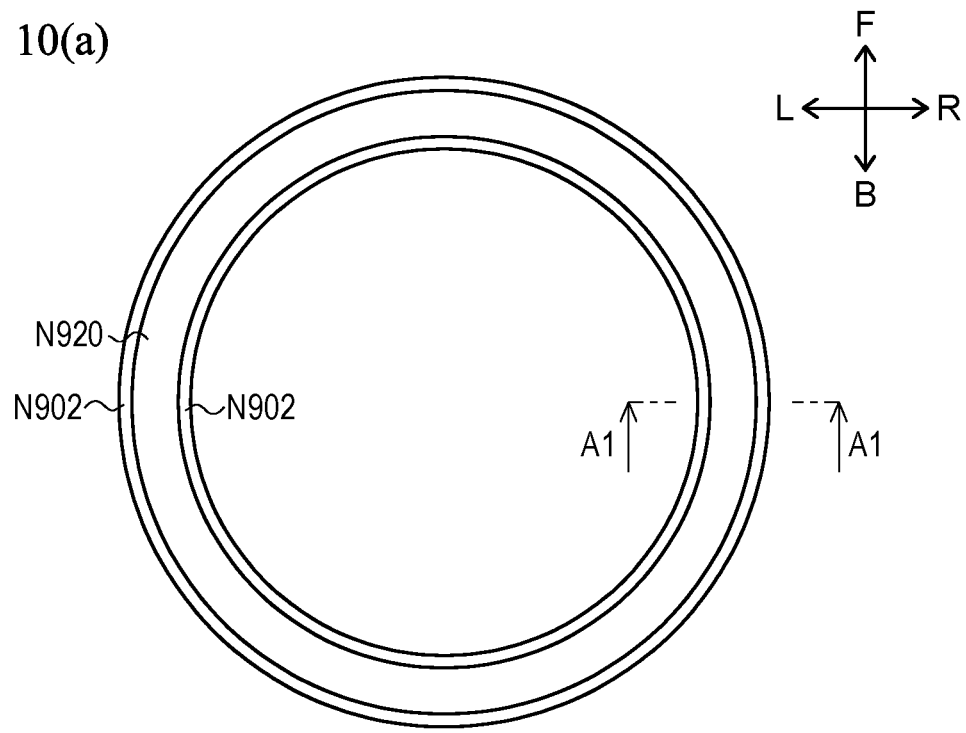
FIG. 10(a) is a plan view of a washer according to prior art.
Figure 10B:
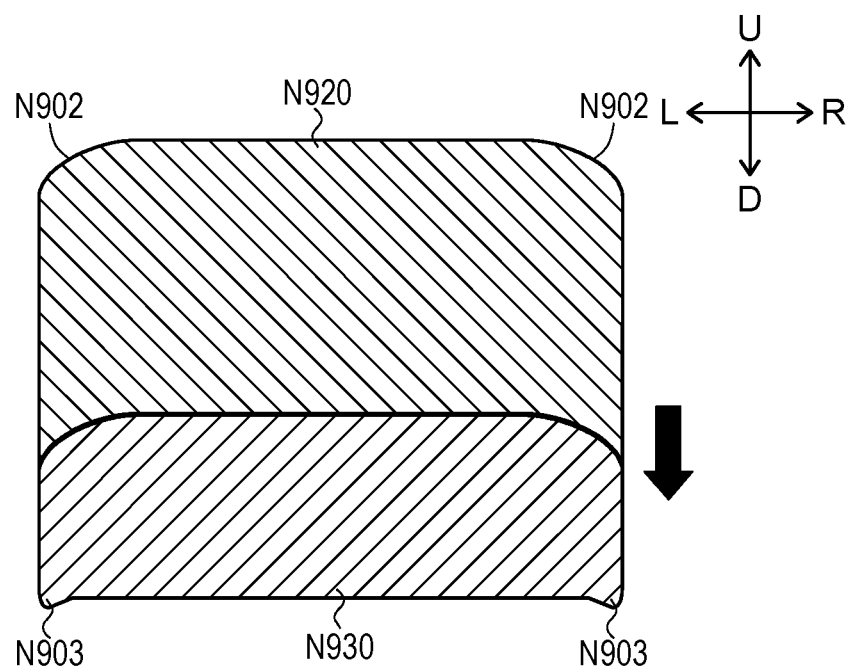
FIG. 10(b) is a cross-sectional view taken along line A1-A1.

Here, if a washer 10 is manufactured by stamping a panel-shaped member N from an upper side toward a lower side (from a back metal N920 side to a sliding portion N930 side) as shown in FIGS. 10(*a*) and 10(*b*), the back metal N920 and the sliding portion N930 may become detached from each other due to a stress in the stamping of the panel-shaped member N. On the other hand, in the method of manufacturing the washer 10 according to the embodiment, the panel-shaped member N is cut by using the laser L2 (see FIG. 3). In this way, a stress in stamping the panel-shaped member N is not generated and therefore it is possible to prevent the detachment of the back metal 20 and the sliding portion 30 from each other due to the stress.

When the panel-shaped member N is stamped, droops N902 and burrs N903 are formed on the washer. The droops N902 are formed on an upper face of the back metal N920 and formed throughout outer peripheral and inner peripheral end portions of the back metal N920. To remove the droops N902, it is necessary to shave the upper face of the back metal N920. Therefore, if the droops N902 are formed, it is necessary to increase a thickness of the panel-shaped member N in advance to secure a machining allowance given to the upper face of the panel-shaped member N.

The burrs N903 are formed to protrude from a lower face of the sliding portion N930. The burrs N903 are formed throughout outer peripheral and inner peripheral end portions of the sliding portion N930. To remove the burrs N903, it is necessary to shave off the burrs N903 by using a predetermined tool or the like, for example.

On the other hand, the washer 10 according to the embodiment is formed by cutting the panel-shaped member N with the laser L2.

Therefore, the washer 10 sustains only dross on the sliding portion 30 (a minute protrusion formed on the opposite face from the face irradiated with the laser L2).

Therefore, it is possible to complete finishing work on the washer 10 more easily (only by slightly shaving the sliding portion 30) than in the case of removing the droops N902 and the burrs N903. Moreover, it is unnecessary to shave the upper face of the back metal N920, which reduces a cost required for the finishing work. As a result, it is possible to reduce the thickness of the panel-shaped member N to thereby improve the material yield.

Figure 11A:
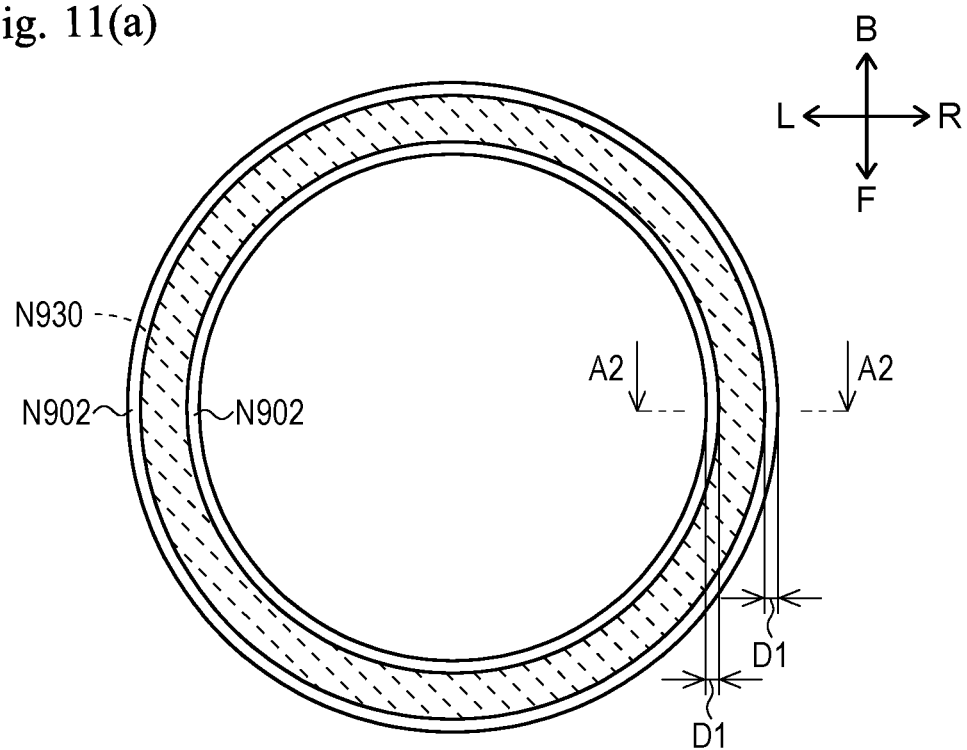
FIG. 11(a) is a bottom view of a sliding area of a washer according to prior art.
Figure 11B:
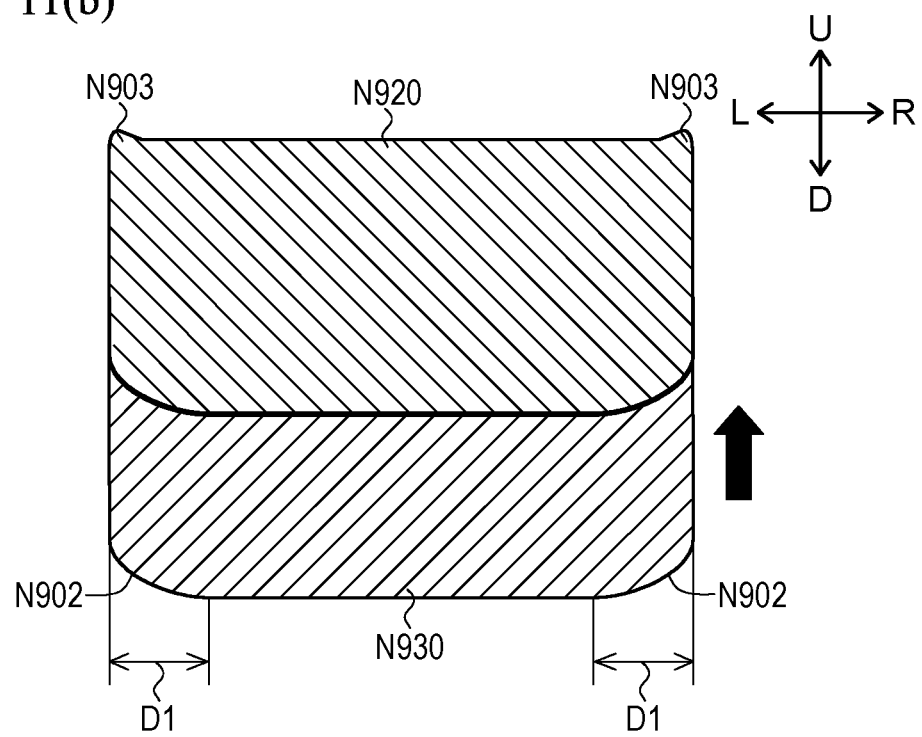
FIG. 11(b) is a cross-sectional view taken along line A2-A2.

If the panel-shaped member N is stamped from the lower side toward the upper side (from the sliding portion N930 to the back metal N920) as shown in FIGS. 11(a) and 11(b), burrs N903 are formed on the back metal N920 and droops N902 are formed on the sliding portion N930. Here, the droops N902 are formed in arc shapes (or curved face shapes) in cross-sectional view. A radial length D1 of each of the droops N902 is 0.2 to 1.0 mm, for example. If the droops N902 are formed, entire areas of the outer peripheral and inner peripheral end portions of the lower face of the sliding portion N930 are in chamfered shapes. In this case, the sliding portion N930 is not able to slide against the other member at the portions (see the radial lengths D1 of the droops N902 shown in FIGS. 11(a) and 11(b)) where the droops N902 are formed. Therefore, a portion of the lower face of the sliding portion N930 where the droops N902 are not formed, i.e., an area of the portion with dotted diagonal hatch lines shown in FIG. 11(a) serves as a sliding area. As described above, if the droops N902 are formed, the sliding area of the sliding portion N930 is reduced.

Figure 9:
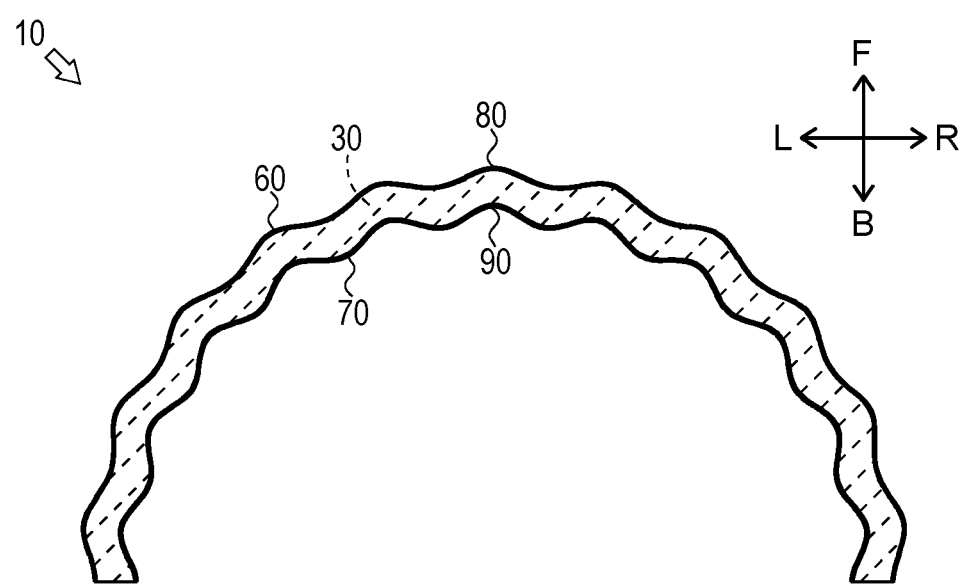
FIG. 9 is a plan view of a sliding area of the washer.

On the other hand, the washer 10 according to the embodiment is formed by cutting the panel-shaped member N with the laser L2. Therefore, the front edge portion 80 and the back edge portion 90 in the substantially right-angled shapes in cross-sectional view are formed as shown in FIGS. 6(a) and 6(b) without forming the droops N902 on the sliding portion 30. In this way, as shown in FIG. 9, the sliding portion 30 is able to slide against the other member with substantially the entire areas of the outer peripheral and inner peripheral end portions of the upper face as well. Therefore, substantially the entire area of the upper face of the sliding portion 30, i.e., an area with dotted diagonal hatch lines shown in FIG. 9 serves as a sliding area. In this way, it is possible to suppress reduction in the sliding area of the washer 10.

Moreover, the portions of the sliding portion 30 according to the embodiment where the front molten portion 60 and the back molten portion 70 are formed (the outer peripheral and inner peripheral end portions) have higher hardness than the other portion. In this way, it is possible to suppress wear of the portions of the washer 10 where the front molten portion 60 and the back molten portion 70 are formed. As a result, it is possible to suppress the local wear of the outer peripheral and the inner peripheral end portions of the sliding portion 30, which are likely to wear, to thereby improve wear resistance of the washer 10 according to the embodiment.

As shown in FIGS. 5(a), 5(b), 7(a), and 7(b), the longitudinal member N1 according to the embodiment is formed to have the constant front-back width W and therefore it is possible to prevent local reduction in rigidity. In this way, it is possible to increase strength of the washer 10.

Moreover, by bending and deforming the longitudinal member N1 having the trough portions 42, 52 of the front wave-shaped portion 40 and the back wave-shaped portion 50 disposed at the positions displaced from each other in the left-right direction, it is possible to displace the trough portions 42, 52 of the washer 10 from each other in the circumferential direction. As a result, it is possible to distance the trough portions 42, 52, i.e., the portions on which a stress is likely to act, from each other. In this way, it is possible to increase strength of the washer 10.

Furthermore, the front wave-shaped portion 40 and the back wave-shaped portion 50 according to the embodiment are formed from the right end portion to the left end portion of the longitudinal member N1 so that the larger number of peak portions 41, 51 and trough portions 42, 52 are formed on the front face and the back face. As a result, it is possible to distribute the stress to the large number of trough portions 42, 52 of the longitudinal member N1 (the washer 10) in the forming step. In this way, it is possible to increase the strength of the washer 10. Moreover, by forming the larger number of peak portions 41, 51, it is possible to suppress the reduction in the sliding area.

The trough portions 42, 52 of the front wave-shaped portion 40 and the back wave-shaped portion 50 according to the embodiment have the tip end portions 42a, 52a formed in the substantially arc shapes (the shapes without pointed portions) in plan view. In this way, it is possible to distribute the stress to the entire tip end portions 42a, 52a of the trough portions 42, 52 of the washer 10. In this way, it is possible to increase strength of the washer 10.

The front wave-shaped portion 40 and the back wave-shaped portion 50 of the longitudinal member N1 according to the embodiment are formed in the substantially sinusoidal shapes in plan view. As a result, it is possible to distribute the stress to the entire tip end portions 41a, 51a of the peak portions 41, 51 of the front wave-shaped portion 40 and the back wave-shaped portion 50. In this way, it is possible to increase strength of the washer 10. Moreover, it is possible to smoothly deform the longitudinal member N1 by bending.

As described above, the washer 10 (sliding member) according to the embodiment includes: the back metal 20 (first member) formed in the predetermined shape when seen from above (in one direction); the sliding portion 30 (second member) formed in the same shape as the back metal 20 when seen from above and bonded upward to the back metal 20 so that outer edges are aligned with each other; and the front molten portion 60 and the back molten portion 70 (molten portions) formed by melting at least parts of the outer edge portions of the back metal 20 and the sliding portion 30.

With this configuration, it is possible to bring the back metal 20 and the sliding portion 30 in firm and close contact with each other with the front molten portion 60 and the back molten portion 70. As a result, it is possible to suppress the detachment of the back metal 20 and the sliding portion 30 from each other.

Moreover, the back metal 20 and the sliding portion 30 are formed in arc shapes when seen from above and the molten portion includes the front molten portion 60 (outer peripheral molten portion) formed by melting the whole of portions of the back metal 20 and the sliding portion 30 corresponding to an outer peripheral portion of the arc.

With this configuration, it is possible to join entire outer peripheral end portions of the back metal 20 and the sliding portion 30 with the front molten portion 60. As a result, it is possible to effectively suppress the detachment of the back metal 20 and the sliding portion 30 from each other.

Furthermore, the back metal 20 and the sliding portion 30 are formed in arc shapes when seen from above and the molten portion includes the back molten portion 70 (inner peripheral molten portion) formed by melting the whole of portions of the back metal 20 and the sliding portion 30 corresponding to an inner peripheral portion of the arc.

With this configuration, it is possible to join entire inner peripheral end portions of the back metal 20 and the sliding portion 30 with the back molten portion 70. As a result, it is possible to effectively suppress the detachment of the back metal 20 and the sliding portion 30 from each other.

Moreover, as described above, the method of manufacturing the washer 10 according to the embodiment includes: a preparing step (step S10) of preparing the panel-shaped member N; the cutting step (step S20) of cutting the panel-shaped member N with the laser L2 to thereby obtain the longitudinal member N1; and the forming step (step S30) of obtaining the arc-shaped washer 10 by using the longitudinal member N1.

With this configuration, it is possible to prevent the formation of the droops N902 and the burrs N903 in cutting the panel-shaped member N. Therefore, it is possible to suppress the reduction in the sliding area due to the formation of the droops N902. Furthermore, the cost required for the work for removing the droops N902 (the cost for the finishing work) becomes unnecessary, which improves the material yield. Moreover, it is possible to simplify the step for removing the droops N902 and the burrs N903 (the finishing work) to thereby reduce the cost required for manufacturing the washer 10.

The panel-shaped member N has the equal width to the longitudinal width of the longitudinal member N1. The cutting step is a step of cutting the panel-shaped member N from one end to the other end in the width direction to thereby obtain the longitudinal member N1 and the forming step is a step of deforming the longitudinal member N1 into the arc shape so that the cut faces of the longitudinal member N1 form the outer peripheral face and the inner peripheral face. The width direction in the embodiment refers to one direction (the left-right direction which is the longitudinal direction in the embodiment) of the panel-shaped member N having the equal width to the longitudinal width of the longitudinal member N1.

With this configuration, it is possible to substantially linearly cut the panel-shaped member N. Therefore, as compared with the case of stamping the panel-shaped member N into the ring shape, it is possible to reduce amounts of the scraps S1. By cutting the panel-shaped member N having the equal width to the longitudinal width of the longitudinal member N1 from the one end to the other end in the width direction, it is possible to cut the panel-shaped member N without wasting the left end portion and the right end portion of the panel-shaped member N. As a result, it is possible to effectively improve the material yield. Moreover, by deforming the longitudinal member N1 into the arc shape so that the cut faces of the longitudinal member N1 form the outer peripheral face and the inner peripheral face of the washer 10, it is possible to form the front edge portion 80 and the back edge portion 90 at the outer peripheral end portion and the inner peripheral end portion of the upper face of the sliding portion 30. In this way, as compared with the case of stamping the panel-shaped member N, it is possible to suppress the reduction in the sliding area.

The washer 10 according to the embodiment is the washer 10 including the sliding portion 30 capable of sliding against the other member and the front edge portion 80 and the back edge portion 90 (edge portion) in the substantially right-angled shapes in cross-sectional view are formed at at least a part of the outer edge of the sliding portion 30.

With this configuration, it is possible to cause the part of the outer edge of the sliding portion 30 to slide against the other member (the part is able to form a part of the sliding face). In this way, as compared with the case of stamping the panel-shaped member N, it is possible to suppress the reduction in the sliding area.

The front edge portion 80 and the back edge portion 90 are formed to have radiuses of curvature in cross-sectional view of 0.05 mm or smaller.

With this configuration, the front edge portion 80 and the back edge portion 90 have the sufficiently small radiuses of curvature. Therefore, it is possible to cause a larger area of the part of the outer edge of the sliding portion 30 to slide against the other member. In this way, it is possible to effectively suppress the reduction in the sliding area.

The sliding portion 30 is formed in the arc shape and the front edge portion 80 is formed at the portion of the sliding portion 30 corresponding to the outer peripheral portion of the arc.

With this configuration, it is possible to cause the substantially entire area of the outer peripheral end portion of the upper face of the sliding portion 30 to slide against the other member (the entire area is able to form the part of the sliding face). In this way, it is possible to effectively suppress the reduction in the sliding area.

The sliding portion 30 is formed in the arc shape and the back edge portion 90 is formed at the portion of the sliding portion 30 corresponding to the inner peripheral portion of the arc.

With this configuration, it is possible to cause the substantially entire area of the inner peripheral end portion of the upper face of the sliding portion 30 to slide against the other member (the entire area is able to form the part of the sliding face). In this way, it is possible to effectively suppress the reduction in the sliding area.

The front edge portion 80 and the back edge portion 90 according to the embodiment are an embodiment of the edge portion according to the invention.

As described above, the washer 10 according to the embodiment is the washer 10 including the sliding portion 30 capable of sliding against the other member and the front molten portion 60 and the back molten portion 70 (high hardness portion) having higher hardness than the other portion are formed at at least a part of the outer edge of the sliding portion 30.

With this configuration, it is possible to increase hardness of the outer peripheral and inner peripheral end portions of the sliding portion 30, which are likely to wear, to thereby improve the wear resistance.

The sliding portion 30 is formed in the arc shape and the front molten portion 60 is formed at the portion of the sliding portion 30 corresponding to the outer peripheral portion of the arc.

With this configuration, it is possible to increase hardness of the entire outer peripheral end portion of the sliding portion 30 to thereby effectively improve the wear resistance.

The sliding portion 30 is formed in the arc shape and the back molten portion 70 is formed at the portion of the sliding portion 30 corresponding to the inner peripheral portion of the arc.

With this configuration, it is possible to increase hardness of the entire inner peripheral end portion of the sliding portion 30 to thereby effectively improve the wear resistance.

The washer 10 further includes the back metal 20 to which the sliding portion 30 is bonded and the front molten portion 60 and the back molten portion 70 are formed by melting the sliding portion 30.

With this configuration, it is possible to achieve improvement of the wear resistance and suppression of the detachment of the back metal 20 and the sliding portion 30 from each other only by performing the single work (melting the sliding portion 30).

Although the embodiment of the present invention has been described above, the invention is not limited to the above-described configurations and can be changed in various ways without departing from a scope of the invention described in the claims.

For example, though the washer 10 is formed in the semicircular shape in plan view, the shape of the washer 10 is not limited to the semicircular shape. The washer 10 may be formed in an arc shape having a central angle of 90°, for example.

Although the front molten portion 60 is formed at the entire outer peripheral end portion of the sliding portion 30, the area in which the front molten portion 60 is formed is not limited to the entire outer peripheral end portion. The front molten portion 60 may be formed at a part of the outer peripheral end portion of the sliding portion 30, for example. The member on which the front molten portion 60 is formed is not limited to the sliding portion 30. The front molten portion 60 may be formed on the back metal 20, for example. The front molten portion 60 does not necessarily have to be formed on one member. The front molten portion 60 may be formed on the plurality of members (the back metal 20 and the sliding portion 30).

Although the back molten portion 70 is formed at the entire inner peripheral end portion of the sliding portion 30, the area in which the back molten portion 70 is formed is not limited to the entire inner peripheral end portion. The back molten portion 70 may be formed at a part of the inner peripheral end portion of the sliding portion 30, for example. The member on which the back molten portion 70 is formed is not limited to the sliding portion 30. The back molten portion 70 may be formed on the back metal 20, for example. The back molten portion 70 does not necessarily have to be formed on one member. The back molten portion 70 may be formed on the plurality of members (the back metal 20 and the sliding portion 30).

Although the panel-shaped member N is cut in the substantially left-right direction in the cutting step, a cutting direction is not limited to the substantially left-right direction. For example, the panel-shaped member N may be cut in a substantially arc shape. In this case, the cutting step includes a forming step. In a cutting step, a panel-shaped member having a larger width than a longitudinal width of a longitudinal member N1 may be cut along an outside shape of the longitudinal member N1. In a cutting step, a panel-shaped member formed in a substantially sinusoidal shape in plan view may be cut in a front-back direction.

Although oxygen is used as the assist gas in cutting the panel-shaped member N in the cutting step, the assist gas is not limited to oxygen. Argon (inert gas) or the like may be used as the assist gas, for example.

Although the laser L2 is applied to the back metal 20 in the cutting step, the member to which the laser L2 is applied is not limited to the back metal 20. For example, the laser L2 may be applied to the sliding portion 30.

It is not absolutely necessary to perform the finishing work on the washer 10. Therefore, it is possible to effectively reduce the cost required for manufacturing the washer 10.

Although the washer 10 is formed by the bimetal member obtained by bonding two kinds of metal materials together, the number of kinds of metal materials is not limited to two and, for example, may be three or more. The washer 10 does not necessarily have to be formed by the bimetal member and may be made of suitable (one king of) metal material or the like.

Although the longitudinal member N1 is formed in the substantially sinusoidal shape in plan view, the shape of the longitudinal member N1 is not limited to the sinusoidal shape and may be any shapes. In other words, the longitudinal member N1 does not necessarily have to have the front wave-shaped portion 40 and the back wave-shaped portion 50.

INDUSTRIAL APPLICABILITY

The present invention is applicable to the method of manufacturing the washer for receiving the load and the technique of the washer.

REFERENCE SIGNS LIST

10: Washer
L2: Laser
N: Panel-shaped member
N1: Longitudinal member

The invention claimed is:

1. A method of manufacturing a washer, the method comprising:
   a preparing step of preparing a panel-shaped member comprising a sliding portion capable of sliding against another member;
   a cutting step of cutting the panel-shaped member with the sliding portion with a laser to thereby obtain a longitudinal member that includes a part of the sliding portion, the longitudinal member having longitudinal side edges on opposite sides of the longitudinal member, the longitudinal side edges extending in a direction in which the laser is applied, the longitudinal side edges of the longitudinal member having arc shaped peak portions and arc shaped trough portions adjacent to the peak portions formed alternately and continuously in the longitudinal direction, wherein the part of the sliding portion on the longitudinal member extends from one of the longitudinal side edges to another of the longitudinal side edges, and forms at least a part of the longitudinal side edges on opposite sides of the longitudinal member, and the portions of the longitudinal side edges that are formed of the sliding portion have a higher hardness than a portion of the sliding portion that is between the longitudinal side edges; and
   a forming step of forming the longitudinal member into an arc-shaped washer, such that one of the longitudinal side edges forms an outer peripheral side of the arc-shaped washer, and another of the longitudinal side edges forms an inner peripheral side of the arc-shaped washer, the arc-shaped washer having the peak portions and the trough portions formed alternately and continuously in the circumferential direction in the outer peripheral side and the inner peripheral side, by bending and deforming the longitudinal member.

2. The method of manufacturing the washer according to claim 1, wherein
   the panel-shaped member has an equal width to a longitudinal width of the longitudinal member,
   the cutting step is a step of cutting the panel-shaped member from one end to the other end in a width direction to thereby obtain the longitudinal member, and the forming step is a step of deforming the longitudinal member into an arc shape so that cut faces of the longitudinal member form an outer peripheral face and an inner peripheral face.

3. The method of manufacturing the washer according to claim 1, wherein the sliding portion has a lower coefficient of friction than a remaining portion of the longitudinal member.

* * * * *